(12) United States Patent
Benzon et al.

(10) Patent No.: US 9,511,293 B2
(45) Date of Patent: Dec. 6, 2016

(54) SYSTEM AND METHOD FOR INTERACTIVE MULTIPLAYER BROADCAST GAME

(71) Applicant: TELEFUN TRANSMEDIA PTE LTD, Singapore (SG)

(72) Inventors: Frederick James Rondolo Benzon, Paranaque (PH); Roland Benzon, Quezon (PH)

(73) Assignee: TELEFUN TRANSMEDIA PTE LTD, Singapore (SG)

(*) Notice: Subject to any disclaimer, the term of this patent is extended or adjusted under 35 U.S.C. 154(b) by 158 days.

(21) Appl. No.: 14/351,300

(22) PCT Filed: Oct. 12, 2012

(86) PCT No.: PCT/SG2012/000382
§ 371 (c)(1),
(2) Date: Apr. 11, 2014

(87) PCT Pub. No.: WO2013/055295
PCT Pub. Date: Apr. 18, 2013

(65) Prior Publication Data
US 2014/0274415 A1   Sep. 18, 2014

(30) Foreign Application Priority Data

Oct. 14, 2011   (SG) .................................. 201107540

(51) Int. Cl.
*A63F 13/12*   (2006.01)
*A63F 13/843*   (2014.01)
(Continued)

(52) U.S. Cl.
CPC ............ *A63F 13/843* (2014.09); *A63F 13/33* (2014.09); *A63F 13/358* (2014.09);
(Continued)

(58) Field of Classification Search
CPC ....................................................... A63F 13/12
See application file for complete search history.

(56) References Cited

U.S. PATENT DOCUMENTS

| 6,579,184 B1 | 6/2003 | Tanskanen | |
|---|---|---|---|
| 2001/0003099 A1* | 6/2001 | Von Kohorn | A63F 13/12 463/40 |
| 2002/0142843 A1* | 10/2002 | Roelofs | A63F 13/10 463/42 |

OTHER PUBLICATIONS

International Search Report & Written Opinion dated Jan. 4, 2013, for International Application No. PCT/SG2012/000382 filed on Oct. 12, 2012, 9 pages.

* cited by examiner

*Primary Examiner* — Omkar Deodhar
(74) *Attorney, Agent, or Firm* — JCIP; Joseph G. Chu (57) ABSTRACT

There is provided a system and method for interactive multi-player broadcast game, the system comprising a plurality of controllers; each controller capable of providing a set of game inputs to a game server in response to the broadcast; wherein the game server is operable to control game play and scoring; the game server further operable to either calculate or receive the latency data associated with each game controller depending on the type of controller and offset the latency during a time-sensitive game play. The above system allows different controllers to be used without biasing against relatively 'dumb' controllers such as the Plain Old Telephone (POT). Further, the above system allows massively multiplayer game to be played in the context of an interactive TV broadcast game with POT as controllers.

14 Claims, 5 Drawing Sheets

(51) Int. Cl.
*A63F 13/358* (2014.01)
*A63F 13/33* (2014.01)
*H04N 21/478* (2011.01)
*H04N 21/24* (2011.01)
*H04N 21/61* (2011.01)
*H04N 21/81* (2011.01)
*A63F 13/355* (2014.01)
*A63F 13/332* (2014.01)
*A63F 13/335* (2014.01)

(52) U.S. Cl.
CPC ..... *H04N 21/2408* (2013.01); *H04N 21/4781* (2013.01); *H04N 21/6112* (2013.01); *H04N 21/6181* (2013.01); *H04N 21/6187* (2013.01); *H04N 21/8173* (2013.01); *A63F 13/332* (2014.09); *A63F 13/335* (2014.09); *A63F 13/355* (2014.09); *A63F 2300/1025* (2013.01); *A63F 2300/534* (2013.01)

SYSTEM AND METHOD FOR INTERACTIVE MULTIPLAYER BROADCAST GAME

FIELD OF THE INVENTION

The present invention relates to a system and method which is suitable for (but not limited to) interactive multiplayer broadcast game. In particular, the broadcast may be TV broadcast.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Interactive TV broadcast game using a plain old telephone (POT) typically requires the POT to be a game controller and a game server or host to process the Dual-Tone Multi-Frequency signaling (DTMF) tones or voice received over the POT handset to facilitate the game play. The game server may also include an Interactive Voice Response Service (IVRS) to process the DTMF tones or voice.

An example of an Interactive TV broadcast game in the 1970s using POTs is the game known as 'TV Pow!'. 'TV Pow!' allows a call-in player to yell 'POW!' every time a target, for example, a spaceship moved within a crosshair in the middle of the TV screen. In the context of 'TV Pow!', the game server is a processor configured to receive output voice and process whether a spaceship looking object is within the crosshair (i.e. target).

Figure 1:
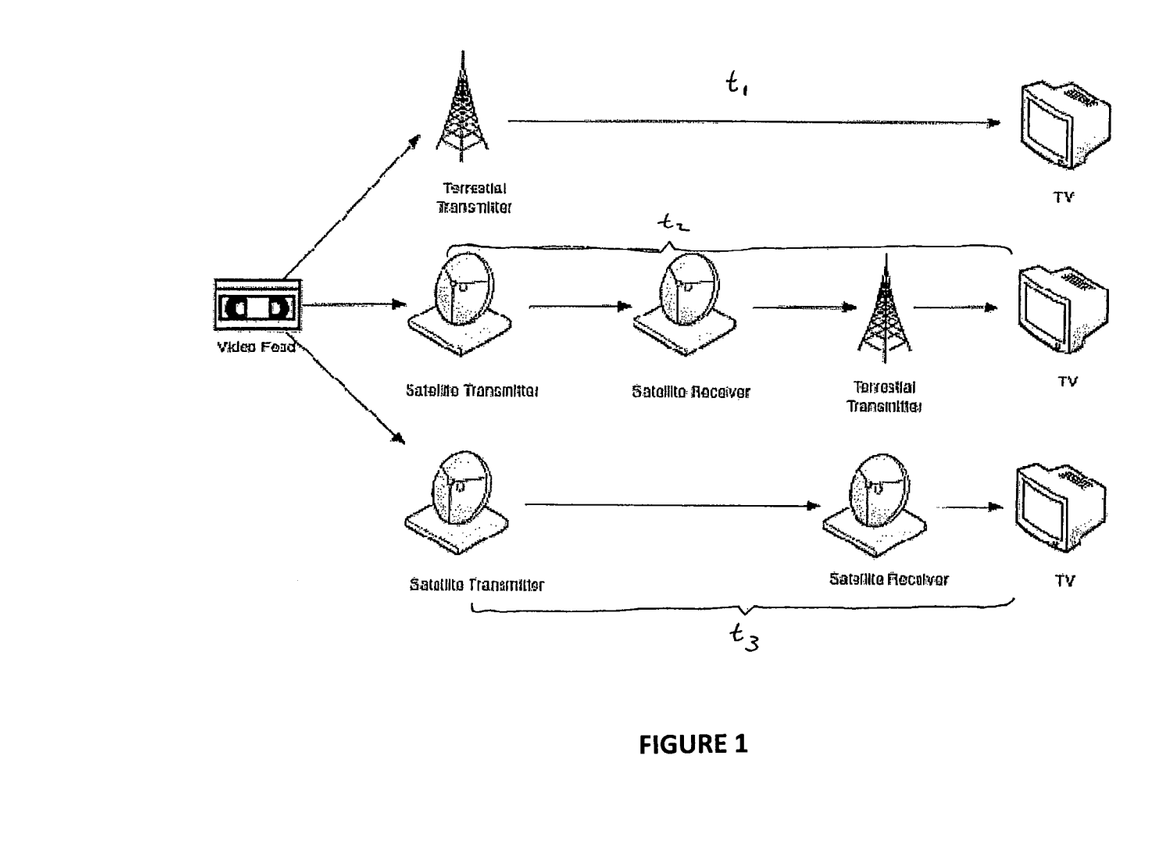
FIG. 1 illustrates the concept of display latency arising from the different means of delivering a transmission
Figure 2:
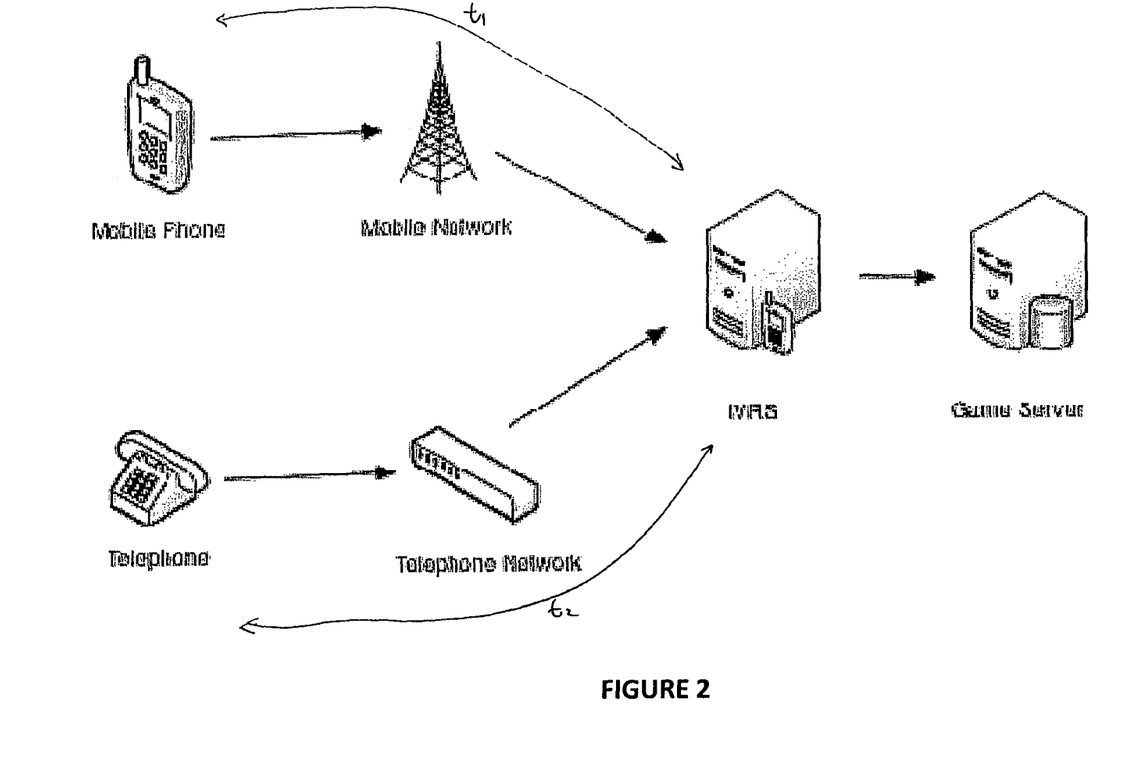
FIG. 2 illustrates the concept of phone latency arising from the distance, transmission medium (fixed-line telephony vs mobile telephony)

A main disadvantage of the TV broadcast game such as the TV Pow! game is the fact that it may not be suitable in a multiplayer context due to delays or latencies associated with different POT system, which inevitably makes it increasingly biased against players with higher latencies or delays. This latency shall be referred to as phone latency. In addition, broadcast television signals are received and displayed on different television, sets at different times (which may range from one to thousands of milliseconds apart) due to various latency factors such as mode of transmission, number of hops, attenuation etc. This second form of latency or delay shall be referred to as display latency. As illustrated in FIG. 1 and FIG. 2, broadcast of TV may be transmitted directly from a terrestrial transmitter to a TV set, via satellite transmitter-receiver or a combination of both, each of which causes different amounts of delay.

In addition to the problems associated with latencies, the plain old telephones are relatively 'dumb' devices compared with recent telephony technologies. While the plain old telephones can generate and transmit tones, each tone corresponding to a particular digit pressed by a user, a POT cannot transmit information such as the time of a key press and the duration of the key press.

With the advancement of technology, multiplayer games are made possible over communication networks such as Internet, mobile telecommunications networks etc. Current multiplayer games require the use of specialized gaming consoles and controllers which are technologically more advanced than the simple POT. Video games, for example, have specialized controllers depending on the games and may be wired or wireless in data communication with their gaming console. Some music-based multiplayer games such as 'Guitar Hero' or 'Rock Band' may have specialized controllers shaped in the form of guitar, drums, microphones, etc., for enhanced game play.

However, video game developers generally design with the intelligent controllers in mind. Although these intelligent controllers do not have problem associated with latencies or delays described above because they may send timing information such as timestamp as a parameter to the game server and may adequately synchronize video playback, video game developers typically market the gaming systems (i.e. computers, game consoles, controllers, software etc.) as a video game package, with a relatively premium price attached to the package. In emerging markets, this represents high cost where a great majority of people may not be able to afford such specialized controllers.

There is at present no interactive, broadcast game for multiple players on multi-platforms wherein the broadcast game is able to accept inputs from different types of controllers.

In addition to the above, there is also at present no Interactive, broadcast game for multiple players on multi-platforms which permit synchronization across different controllers and communication networks.

The present invention seeks to alleviate or reduce the above mentioned drawbacks.

SUMMARY OF THE INVENTION

In accordance with a first aspect of the present invention there is provided a system for interactive multi-player broadcast game, the system comprising a plurality of game controllers; the plurality of game controllers comprising at least one Plain Old Telephone (POT) controller and at least one intelligent controller, wherein each controller is capable of providing a set of game inputs to a game server in response to the broadcast; and wherein the game server is operable to control game play and scoring.

Preferably, the game server is further operable to either calculate or receive the latency data associated with each game controller depending on the type of controller and offset the latency during game play.

Preferably, the broadcast is transmitted by a TV broadcast network. Examples of the TV broadcast network include TV broadcast transmissions using terrestrial TV, cable TV, satellite TV or Internet TV.

Preferably, where a game controller is POT, the game server is operable to calculate the latency associated with the POT; and where the game controller is an intelligent controller, the game server is operable to receive the latency data associated with the intelligent controller via a timestamp.

Preferably, the latency data associated with the intelligent controller is computed by the intelligent controller.

Preferably, the latency data associated with the intelligent controller is computed by the game server.

Preferably, the calculation of latency includes the calculation of at least the display latency and controller latency.

In accordance with a second aspect of the present invention there is provided a method for interactive multi-player broadcast game comprising the following steps: Receiving at a game server a set of game inputs from a plurality of game controllers; the plurality of game controllers comprising at least one POT controller and at least one intelligent controller; and controlling at the game server, the game play and scoring.

Preferably, the game server is further operable to either calculate or receive the latency data associated with each game controller depending on the type of controller and offset the latency during game play.

Preferably, the broadcast is transmitted by a TV broadcast network. Examples of the TV broadcast network include TV broadcast transmissions using terrestrial TV, cable TV, satellite TV or Internet TV.

Preferably, where a game controller is POT, the game server is operable to calculate the latency associated with the POT; and where the game controller is an intelligent controller, the game server is operable to receive the latency data associated with the intelligent controller via a timestamp.

Preferably, the latency data associated with the intelligent controller is computed by the intelligent controller.

Preferably, the latency data associated with the intelligent controller is computed by the game server.

Preferably, the calculation of latency includes the calculation of at least the display latency and controller latency.

In accordance with a third aspect of the present invention there is provided a system for interactive multi-player broadcast game, the system comprising a plurality of controllers; each controller capable of providing a set of game inputs to a game server in response to the broadcast; wherein the game server is operable to control game play and scoring; the game server further operable to either calculate or receive the latency data associated with each game controller depending on the type of controller and offset the latency during game play.

Preferably, the at least one controller is a Plain Old Telephone (POT).

Additionally or alternatively, the at least one controller is an intelligent controller.

In accordance with a fourth aspect of the present invention there is provided a method for interactive multi-player broadcast game comprising the following steps: receiving at a game server a set of game inputs from a plurality of game controllers; calculating or further receiving the latency data associated with each game controller depending on the type of controller; and offsetting the latency associated with each game controller during game play Preferably, the at least one controller is a Plain Old Telephone (POT).

Additionally or alternatively, the at least one controller is an intelligent controller.

It is appreciated that the first and second aspects of the invention are suited for non-time-sensitive multiplayer multi-platform game play wherein the broadcast game is able to accept inputs from different types of controllers; and the third and fourth aspects of the invention are suited for a time-sensitive multiplayer multi-platform game play wherein the broadcast game is able to account for different latencies associated with game controllers and offset the same for fairer game play.

BRIEF DESCRIPTION OF THE DRAWINGS

The present invention will now be described, by way of illustrative example only, with reference to the accompanying drawings, of which.

Other arrangements of the invention are possible and, consequently, the accompanying drawings are not to be understood as superseding the generality of the preceding description of the invention.

DESCRIPTION OF EMBODIMENTS OF THE INVENTION

In the context of the embodiments, a timing-based game and rhythm-based games are time-sensitive games and are described as follows:

a. A timing-based game—typically comprises a question, such as that in a trivia game, which requires one answer. In such instances, the fastest respondent with the correct answer wins.

b. Rhythm games—which may require patterns or sequences of timing-based player actions. In such instances, a rhythm game is essentially a pattern or sequential form of a timing-based game. In this sense a rhythm game may be regarded as a longer derivative of a timing-based game. Rhythm games may be musical in nature, examples of such play include Guitar Hero, Rock Band, Simon; Dance Aerobics; PaRappa the Rapper; Beatmania; GuitarFreaks; Pop'n Music, etc.

In contrast to the above, games which are non time-sensitive do not:

a. require players to compete in a way that the player with the fastest response time is deemed to be the winner, or b. require players to execute a series of patterns or sequences coinciding with a played series of patterns or sequences within a pre-determined time; done in a way that the player with the closest match with the series of patterns is deemed the winner.

Figure 3:
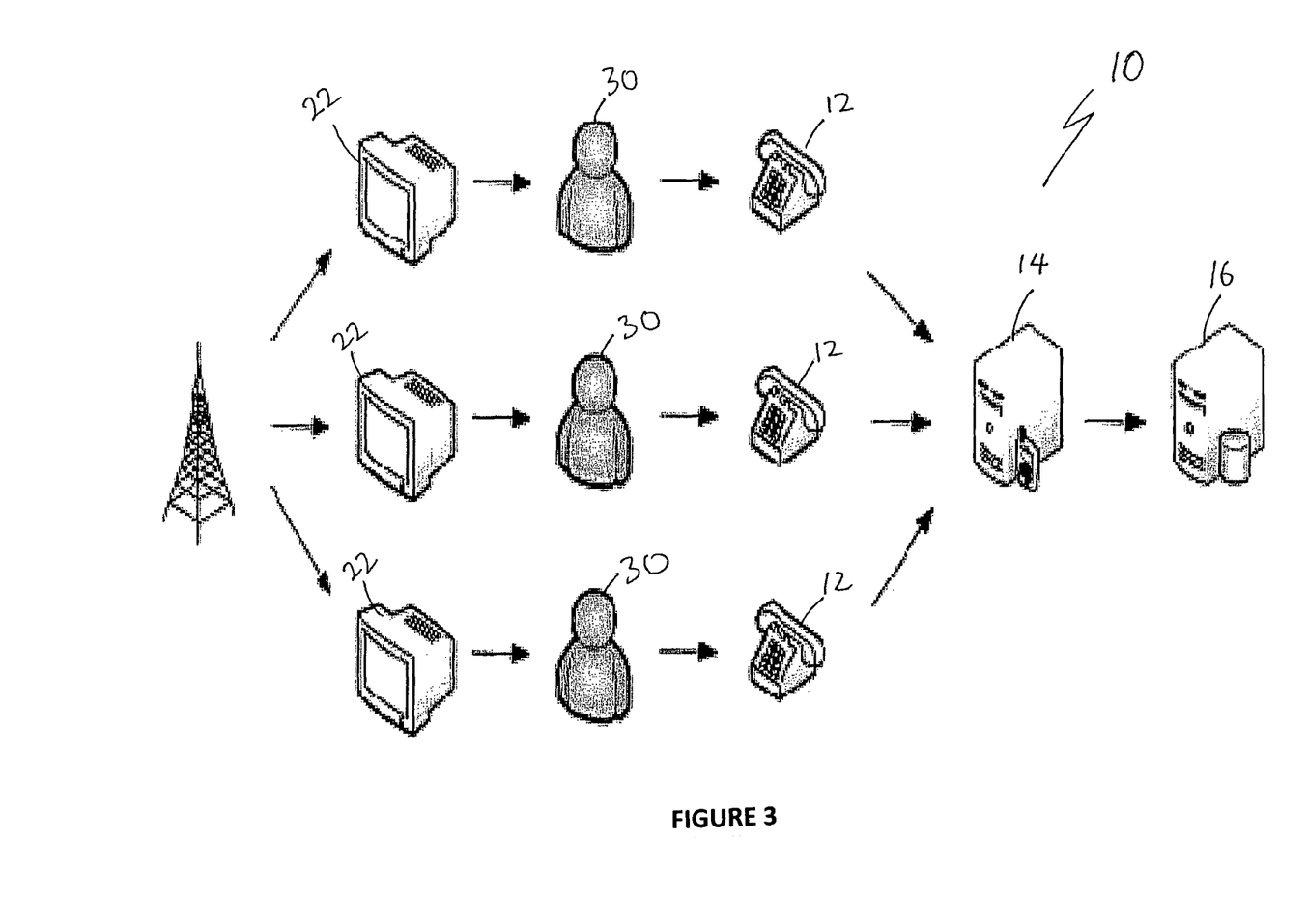
FIG. 3 is a system diagram of the invention in accordance with an embodiment of the invention.

In accordance with an embodiment of the invention there is provided a system 10 for multi-player game play as illustrated in FIG. 3. The system 10 comprises a plurality of game controllers 12 corresponding to the number of players 30 in the system 10. Each game controller 12 is configured to be in data communication with a game server 16. The data communication with the game server 16 may include a response handler/aggregation server 14 capable of receiving inputs from the game controller 12. The response handler/aggregation server 14 may be an IVRS.

Each game controller 12 may be, but is not limited to, a POT.

The IVRS 14 aggregates the telephone calls from each POT 12 and responds to Dual-tone multi-frequency signaling (DTMF) tones or voice calls.

Game server 16 is arranged to record the input of each player 30 and offset the phone and display latency associated with the POT 12 of each player 30 arising from the number of hops or transmitter/receiver delays. Game server 16 is further enabled to calculate the score of each player depending on the type of game. As mentioned in the background section, latency may include display latency, which refers to the delay between the time the broadcast audio/video signal is transmitted from the broadcast facility and the time the signal is displayed at the player's 30 television; and/or phone latency, which refers to the delay between a player's action (key-press on a POT handset) and the time the input (in the form of a DTMF tone) is received and time-stamped at the receiving IVRS.

As an illustrative example where the game to be played is a TV broadcast time-sensitive game, the game's video graphics is broadcast from a television network onto the television set 22 of each player 30 via different transmission mechanisms as elaborated earlier and shown in FIG. 1. Such TV broadcast transmissions may be terrestrial TV, cable TV, satellite TV or Internet TV. Prior to and/or during actual game play, the game server 16 calculates the total latency (both phone and display latencies) via one of the three different ways as described in turn, as follows:

a. Explicit—the determination of latency, without player input
b. Implicit—the determination of latency using player inputs; and
c. Hybrid—the determination of latency using a hybrid of both explicit and implicit methods.

Figure 4:
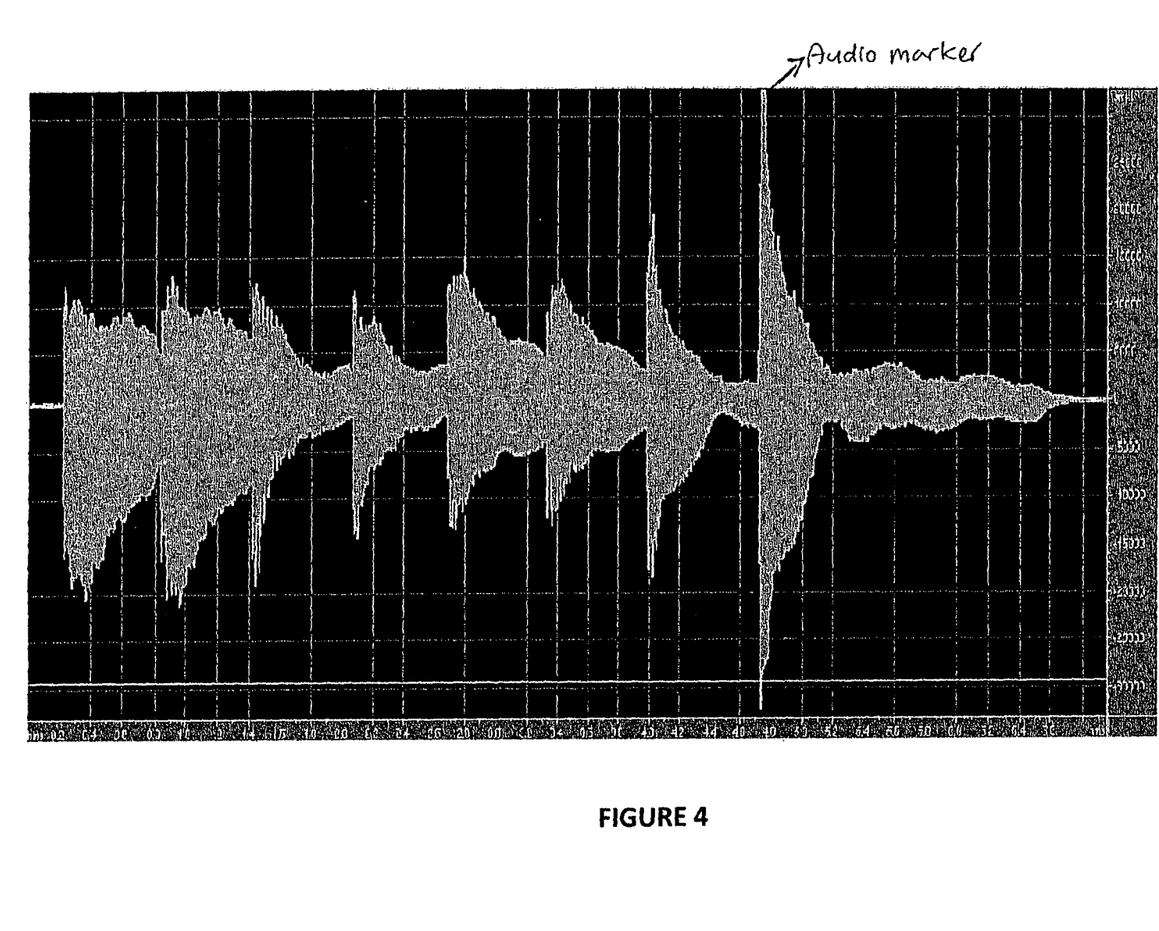
FIG. 4 illustrates a typical audio signature.

The explicit method of determining total latency includes obtaining a unique audio signature broadcasted from the television network. The audio signature comprises at least one marker(s) which will then be used to calculate the total latency. The marker(s) may be defined based on amplitude. An example of an audio signature broadcast with an amplitude based marker is illustrated in FIG. 4.

Upon broadcast of the audio signature, each player 30 is instructed to place his/her POT handset 12 close to the speaker of the television set to feed the audio signal into the mouthpiece of the POT handset 12. Once the audio signal is received by the POT handset 12, it is transmitted from the handset 12 to the IVRS 14, where each player's 30 audio signature is recorded and analysed. Each audio signature may further be processed using known techniques such as noise reduction, amplitude normalization etc. At the IVRS 14 and game server 16, the audio signature marker is identified and the signature marker's timestamp is determined. The total latency of each player 30 is calculated as the time difference between the time of marker broadcast and the time when the marker was recorded at the IVRS/Game Server. If the audio signature marker was broadcast at 12:10:08.060 p.m, and the audio signature of a particular player 30 is detected at 12:10:09:080 p.m, then there exists a total latency of 1.020 seconds or 1020 milliseconds. This total latency value is recorded and inputted in the game server 16 for the particular player 30. The total latency values for every player participating in the game are similarly calculated.

The game server 16 is programmed to offset the total latency of each player 30 during the actual game play. Using the same total latency value (1020 milliseconds) above as an example, if player 30 key press is recorded on the game server at 12:30:10:040 p.m for instance, the game server automatically offsets or corrects the key press to 12:30:09:020 p.m.

As an alternative, the explicit method of calculating the total latency may be initiated by the game server 16 to detect the TV set's audio signature in the background, without the player 30 being explicitly prompted to do so.

The implicit method of calculating total latency requires a sequence of player input, which is more suited for rhythm game. The sequence of player actions is described as follows:

i. A set of audio and/or video markers is broadcast from the television network to each player 30. This is also known as the 'signature sequence playback' step. In the case of musical rhythmic games, at least one marker may be selected or predefined from a sequence of musical notes which is broadcast and displayed on the television screen of each player 30, prior to the actual rhythm game itself, or during the song's introductory section. Each player 30 is then prompted to follow the pattern of notes according to a set of pre-defined rules. Each signature sequence has a distinct pattern. For instance, a rhythm game's signature sequence may require the player 30 to key "1-1-1-2" on their POT 12, whereby the numbers are spaced evenly over time, half a second apart each for example.

ii. Player action—Based on the above sample signature sequence, each player 30 is supposed to press the "1" telephone key three times, followed by a single "2" in a distinct rhythmic pattern. The player 30 inputs the sequence on their POT.

iii. Sequence detection and identification—The inputs of each player 30 are transmitted to the IVRS 14/Game Server 16, recorded and analyzed. In the above sample sequence, "2" can be pre-defined as the marker; the three "1s" can be used merely to establish player rhythm to prepare them to hit the marker "2". The choice of marker may be arbitrary. Using the above sample sequence as an example, the "1" prior to the "2" may actually be a more accurate marker because it requires no finger transfer to a new key. The principle, however, is that once a marker has been defined, it becomes the basis for latency determination. Similar to the explicit method, the implicit method entails the calculation of the time difference between the marker's broadcast time and each player's recorded marker timestamp. If the marker was broadcast at 12:00:00.000 pm, and Player A's marker was recorded at 12:00:01.500 pm, then Player A's total latency is 1.5 seconds or 1500 milliseconds.

iv. Offset calculation—As with the explicit method, offset is calculated similarly as described above. The total latency is deducted from each action's recorded time. The implicit method is particularly useful in rhythm games where players are required to input a sequence or patterns of actions. A player who does not follow the instructions, particularly for establishing the signature, may be disqualified from further game participation.

Hybrid Method—Hybrid latency determination combines both the explicit and implicit methods to more reliably measure latency. If, for instance, the explicit audio signature was too faint or distorted to be reliably used for marker identification and latency determination, the implicit method may be used as a fallback method, for example when the player 30 did not put the phone near the TV loudspeaker, or if the TV volume was not loud enough to be useful. In such a situation, the game server 16 is not able to determine a timestamp for the audio signature marker. The game server 16 may either prompt for a repeat or utilize the implicit method as discussed above as a fallback method. Alternatively, both explicit and implicit methods may be used to refine accuracy. As an example, the accuracy may be refined based on the following algorithm:

a. if there are two latencies determined based on the explicit and implicit method, average the two latencies;
b. if only one of two methods yield a latency figure, use that particular latency figure.
c. If no latency figure or if no meaningful latency figure was obtained, the game server 16 may either use player's 30 previous latency if available or use a latency figure of a player with a similar profile based on location, controller type, connection, location of broadcast station etc.
d. If all of the above is not obtained, the player 30 will be dropped from the game play.

The determination of the total latency or delay at the game server 16 allows the multiple players 30 to access the system 10 and resolve the bias against players 30 with high display and/or phone latency.

Figure 5:
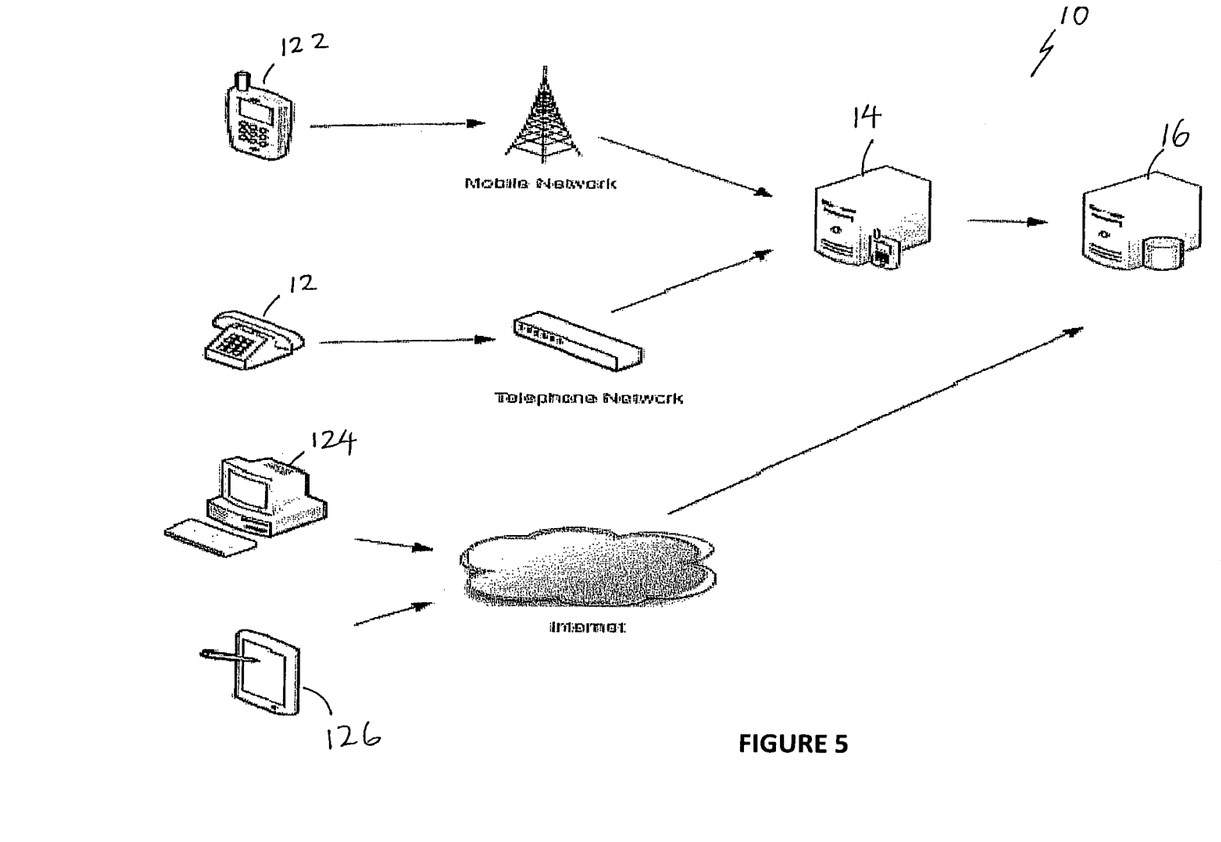
FIG. 5 is a system diagram of the invention in accordance with another embodiment of the invention.

Further advantage of the system 10 is illustrated in FIG. 5 wherein another embodiment, wherein like numerals reference like parts, permits different types of controllers 12 to be used. In this embodiment, players with intelligent controllers (including a mobile phone 122; a computing device 124; a smartphone 126) may simultaneously compete against players 30 using POT 12.

The mobile phone may access the IVRS 14 via a host mobile telecommunications network; and the computing device 124 and smartphone 126 may access the game server 16 directly via the Internet through Wi-Fi, GPRS, wired or other wireless communication means as known to a skilled person. The game server 16 calculates the total latency associated with each controller 12 regardless of whether it is a POT or other intelligent controller(s). Alternatively, as intelligent controllers 122, 124, 126 are capable of installing software with the synchronizing/latency algorithms, the total latency may alternatively be calculated at the intelligent controllers before transmitting the same to the game server 16.

It is thus to be appreciated that as the game server 16 accounts for the latencies associated with each POT and other intelligent controllers in the system 10, there is no unfair advantage provided for the more intelligent controllers, and that all players 30 are able to compete fairly independent of latencies.

It is to be understood that the above embodiments have been provided only by way of exemplification of this invention, such as those detailed below, and that further modifications and improvements thereto, as would be apparent to persons skilled in the relevant art, are deemed to fall within the broad scope and ambit of the present invention described.

Mobile Phone—As all mobile phones 122 can send DTMF signals, they too can serve as game controllers 12 in this invention. In other words, this invention is not limited to POT as described in the further embodiment.

Other DTMF Controllers—While the plain old telephone (POT) exemplifies a dumb game controller in this invention, alternative controllers include similar, computer-less devices (two-way radios) some of which can also send DTMF (dual-tone multi-frequency) signals. Examples of such devices include faux musical instruments (guitars, drum pads, dance pads) with DTMF capability.

Instead of telephone key presses that send DTMF signals, voice may be used as the player action. In a timing game, for instance, a player who verbally answers correctly first is rewarded. This is similar to the TV Pow! game, except: 1) the response can be any word or phrase, not just "Pow!"; and 2) this is massively multiplayer. Another variant voice application that is being contemplated is karaoke, whereby players sing over the telephone and the Game Server 16 determines the winner based on pitch and timing accuracy. In these variants, the invention applies as well, since songs are pitches sung over time, hence, are affected by latency.

Instead of telephone key presses that send DTMF signals, body motion/kinesthetics may also be used to trigger player action or responses, such as that employed by Microsoft's Kinect sensor.

Player Registration—Player invitation/registration may be accomplished in several ways:

1) Explicitly (i.e., player texts a particular keyword to a mobile operator short code, registration in a particular website, sends email address to a designated email server, invitation by a registered player, social network registration, etc.); or 2) Implicitly, by social network association to a registered player.

Telephone Connection The player's telephone connection to the Gaming Server is established in one of two ways: 1) the player dials into the IVRS; or 2) the IVRS calls system-selected players.

Audio Signature—It is to be appreciated that amplitude is not the only means to define a marker in an audio signature. Frequency, audio signal patterns or other means may also be used to define a marker. In addition, audio signatures may be identified or established using Fourier Transform, Discrete Fourier Transform, Fast Fourier Transform and other similar signal processing algorithms known to those skilled in the art of audio and/or pattern recognition. Further, instead of using markers for determination, entire audio clip segments (also known as binary large objects or BLOB) may also be compared to a reference BLOB for pattern recognition and timing comparison, hence, latency determination.

While the above embodiments have described one 'marker' to calculate latency, more markers may be used to more accurately determine latency. In these cases, the latency calculated based on each marker may be averaged based on a multi-marker latency calculation.

Game server 16 may further include auxiliary display in addition to the video being broadcast, etc. For instance, the broadcast video may display nationwide winners, whereas "social network displays" may show players and winners within each player's social network.

As mentioned in the further embodiment, the latency calculation mechanism may be implemented as an algorithm in the form of software installed on the more intelligent controllers 122, 124, 126. The more intelligent controllers 122, 124 and 126 may also be utilized for game controls and scoring for better load distribution, instead of these controls and scoring being performed at the game server 16.

The described embodiments are particularly suited for time sensitive multi-platform game play. Time sensitive game play requires synchronization and latency calculation to account for the use of different types of controllers as illustrated in FIG. 5 or different delays or latencies associated with different POT system in FIG. 3. The calculation and offset of latencies ensure a fairer game play amongst different players. It is easily appreciated that for non-time-sensitive multi-platform game play, the calculation of latency and offset for the same could be easily bypassed. The controllers' inputs are aggregated by the IVRS 14 if necessary and sent to game server 16 for processing without calculation of latency.

Furthermore, although individual embodiments have been discussed it is to be understood that the invention covers combinations of the embodiments that have been discussed as well.

The invention claimed is:

1. A system for facilitating an interactive multi-player broadcast game, the system comprising:
a plurality of game controllers, the plurality of game controllers comprise a Plain Old Telephone (POT) controller and an intelligent controller;
a game server operable to receive from each of the plurality of controllers a set of game inputs in response to the broadcast game; and a broadcast network for transmitting a broadcast related to the interactive multi-player broadcast game;

wherein the game server is operable to control game play and scoring, wherein the game server is further operable to determine latency data associated with the POT controller based on at least a marker that is sent over the broadcast network and offset the latency associated with the POT controller during game play; and wherein the game server is further operable to either calculated or received latency data associated with the intelligent controller and offset the latency associated with the intelligent controller during game play.

2. The system according to claim 1, wherein the determination of the latency associated with the POT controller comprises using either an audio marker that is sent over the broadcast network or a set of player inputs in response to a set of audio and/or visual markers that is sent over the broadcast network.

3. The system according to claim 1, wherein the broadcast network includes TV broadcast transmissions using terrestrial TV, cable TV, satellite TV or Internet TV.

4. The system according to claim 1, wherein where a game controller is POT, the game server is operable to calculate the latency associated with the POT; and where the game controller is an intelligent controller, the game server is operable to receive the latency data associated with the intelligent controller via a timestamp.

5. The system according to claim 1, wherein the latency data associated with the intelligent controller is computed by the intelligent controller.

6. The system according to claim 1, wherein the latency data associated with the intelligent controller is computed by the game server.

7. The system according to claim 1 or 6, wherein the calculation of latency includes the calculation of at least the display latency and controller latency.

8. A method for facilitating an interactive multi-player broadcast game comprising the following steps:

transmitting a broadcast related to the interactive multi-player broadcast game over a broadcast network;

receiving at a game server a set of game inputs from a plurality of game controllers; the plurality of game controllers comprising a POT controller and an intelligent controller;

controlling at the game server, the game play and scoring;

determining latency data associated with the POT controller based on at least a marker that is sent over the broadcast network;

offsetting the latency associated with the POT controller during game play; and wherein the game server is further operable to either calculated or receive latency data associated with intelligent controller and offset the latency associated with the intelligent controller during game play.

9. The method according to claim 8, wherein the step of determining the latency associated with the POT controller comprises using either an audio marker that is sent over the broadcast network or a set of player inputs in response to a set of audio and/or visual markers that is sent over the broadcast network.

10. The method according to claim 9, wherein the TV broadcast network include TV broadcast transmissions using terrestrial TV, cable TV, satellite TV or Internet TV.

11. The method according to claim 8, wherein where a game controller is POT, the game server is operable to calculate the latency associated with the POT; and where the game controller is an intelligent controller, the game server is operable to receive the latency data associated with the intelligent controller via a timestamp.

12. The method according to claim 8, wherein the latency data associated with the intelligent controller is computed by the intelligent controller.

13. The method according to claim 8, wherein the latency data associated with the intelligent controller is computed by the game server.

14. The method according to claim 8 or 13, wherein the calculation of latency includes the calculation of at least the display latency and controller latency.

* * * * *